(12) United States Patent
Nye et al.

(10) Patent No.: US 11,648,709 B2
(45) Date of Patent: *May 16, 2023

(54) SEGMENTED DIE FOR FORMING FINISHED PARTS

(71) Applicant: The Boeing Company, Chicago, IL (US)

(72) Inventors: Jeffrey Garn Nye, East Helena, MT (US); Dustin Alfred Nelson, Clancy, MT (US); Jason Paul Helland, Helena, MT (US); Brian William Ullman, Helena, MT (US); Craig Jenny, Roy, WA (US)

(73) Assignee: The Boeing Company, Chicago, IL (US)

( * ) Notice: Subject to any disclaimer, the term of this patent is extended or adjusted under 35 U.S.C. 154(b) by 868 days.

This patent is subject to a terminal disclaimer.

(21) Appl. No.: 16/540,772

(22) Filed: Aug. 14, 2019

(65) Prior Publication Data
US 2021/0046676 A1    Feb. 18, 2021

(51) Int. Cl.
*B29C 43/36*   (2006.01)
*B29C 33/44*   (2006.01)
*B29C 43/00*   (2006.01)

(52) U.S. Cl.
CPC ............ *B29C 33/44* (2013.01); *B29C 43/003* (2013.01); *B29C 43/36* (2013.01); *B29C 2043/3602* (2013.01); *B29C 2043/3615* (2013.01)

(58) Field of Classification Search
CPC .......... B29C 43/003; B29C 2043/3615; B29C 33/307; B29C 33/305; B29C 33/301; B29C 2043/3411; B29C 43/361
See application file for complete search history.

(56) References Cited

U.S. PATENT DOCUMENTS

| | | | | |
|---|---|---|---|---|
| 2,664,593 | A * | 1/1954 | Larson | B29D 99/0028 425/398 |
| 3,171,163 | A * | 3/1965 | Ford | B64C 27/473 164/90 |
| 3,974,673 | A | 8/1976 | Fosness et al. | |
| 4,212,188 | A * | 7/1980 | Pinson | B21D 5/01 72/413 |
| 4,726,924 | A * | 2/1988 | Mittelstadt | B29C 53/16 156/213 |
| 5,151,277 | A * | 9/1992 | Bernardon | B29C 70/443 249/161 |

(Continued)

OTHER PUBLICATIONS

Ubelaker, D.H., Dental Alteration in Prehistoric Ecuador: A New Example from Jama-coaque, Journal of the Washington Academy of Sciences, vol. 77, No. 2 (Jun. 1987), pp. 76-80. (Year: 1987).*

(Continued)

*Primary Examiner* — Matthew J Daniels
(74) *Attorney, Agent, or Firm* — Sage Patent Group

(57) ABSTRACT

A die assembly for forming finished parts from blanks includes an upper die section and a lower die section. The upper die section includes an upper segmented die having a plurality of upper die segments releasably coupled to each other. The lower die section includes a lower segmented die having a plurality of lower die segments releasably coupled to each other. The die assembly is usable with a movable gantry press configured to move to a location of the die assembly and operate the die assembly.

20 Claims, 17 Drawing Sheets

(56) References Cited

U.S. PATENT DOCUMENTS

| | | | | |
|---|---|---|---|---|
| 8,951,457 | B2* | 2/2015 | Galdeano | B29C 33/307 |
| | | | | 264/219 |
| 9,782,937 | B1* | 10/2017 | Modin | B29C 70/342 |
| 2003/0091679 | A1* | 5/2003 | Aramburu | B29C 33/26 |
| | | | | 425/384 |
| 2016/0121560 | A1* | 5/2016 | Lee | B29C 70/541 |
| | | | | 425/504 |

OTHER PUBLICATIONS

Olsson, Sture, "High Pressure Warm Forming Forms Aerospace Grade Titanium", Stamping Journal May/Jun. 2018; downloaded on Aug. 14, 2019 from: https://www.thefabricator.com/article/stamping/high-pressure-warm-forming-forms-aerospace-grade-titanium.

Shelton, Gary, Roller Screw Actuators: Benefits, Selection and Maintenance:, Design World Jun. 10, 2010; downloaded on Aug. 14, 2019 from: https://www.designworldonline.com/roller-screw-actuators-benefits-selection-and-maintenance/.

Vector Tooling Technologies, "Hot Form Dies"; downloaded on Aug. 14, 2019 from: https://www.vec-tec.com/hot-form-dies1.html.

* cited by examiner

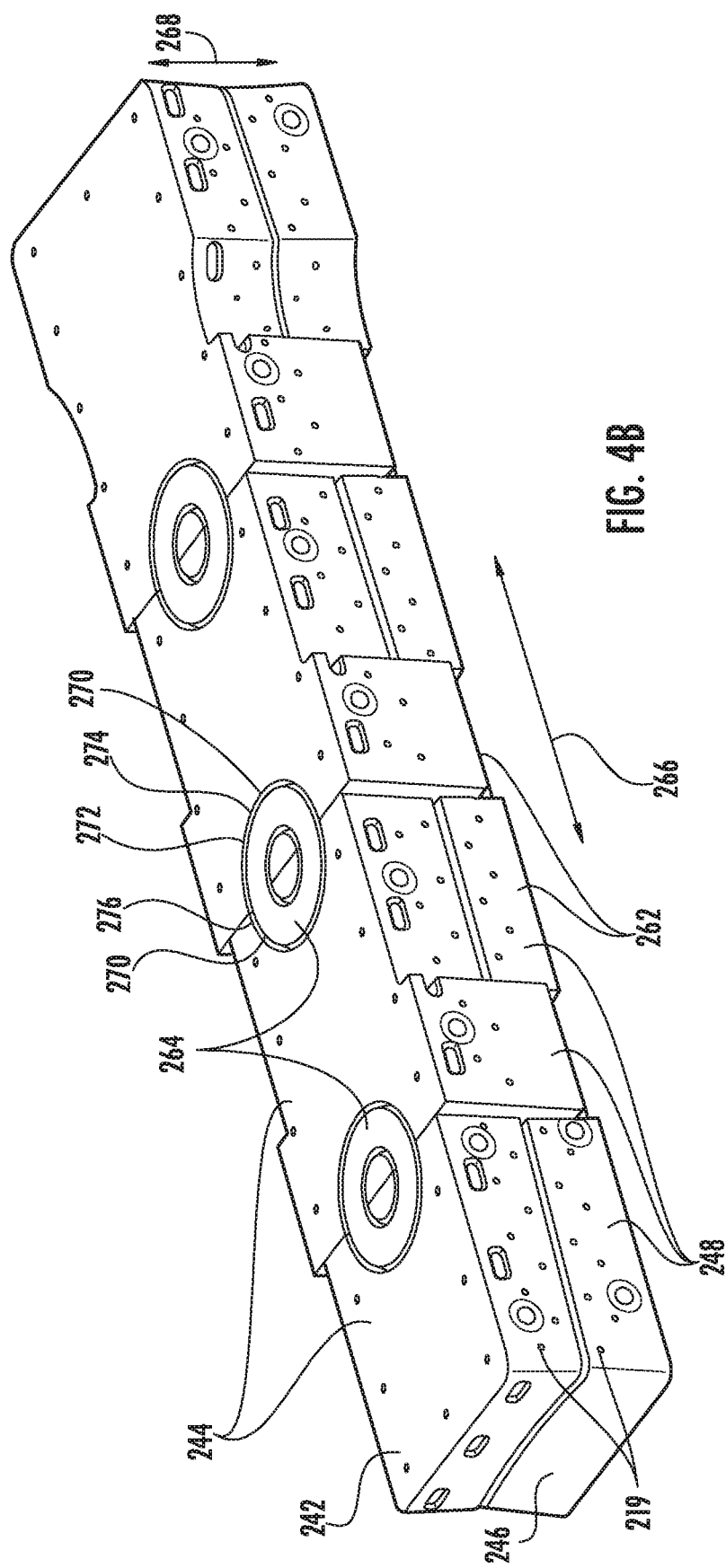

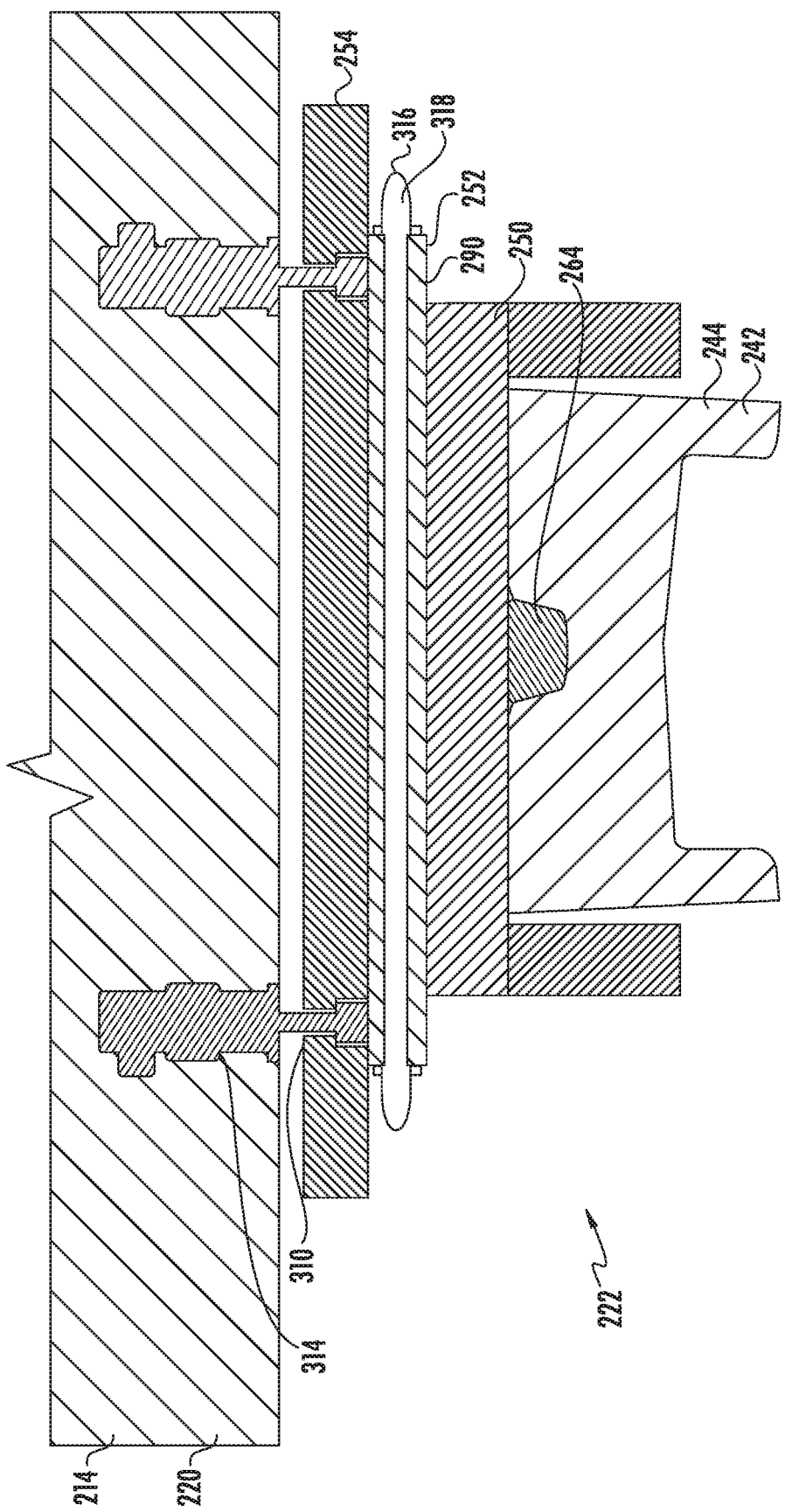

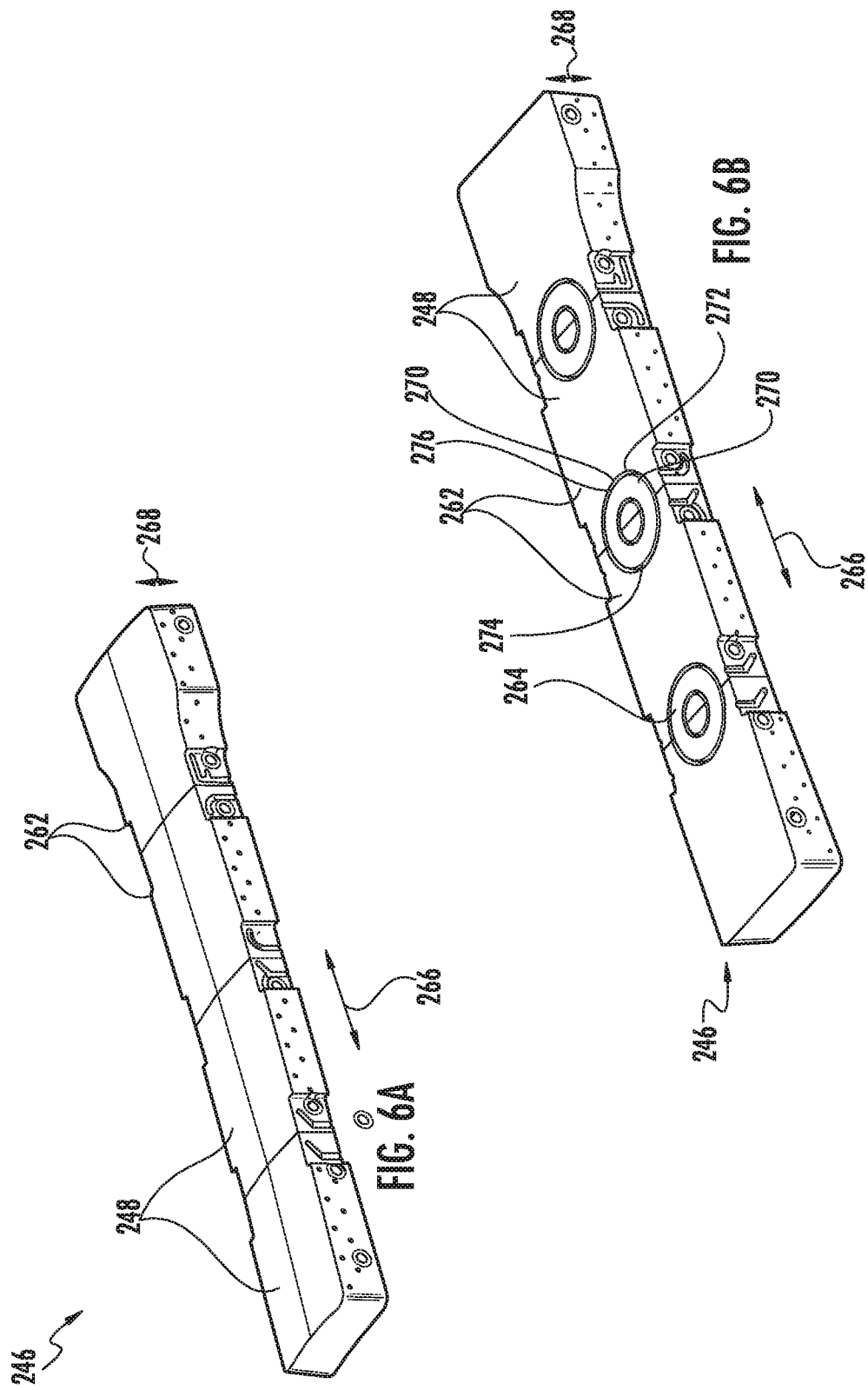

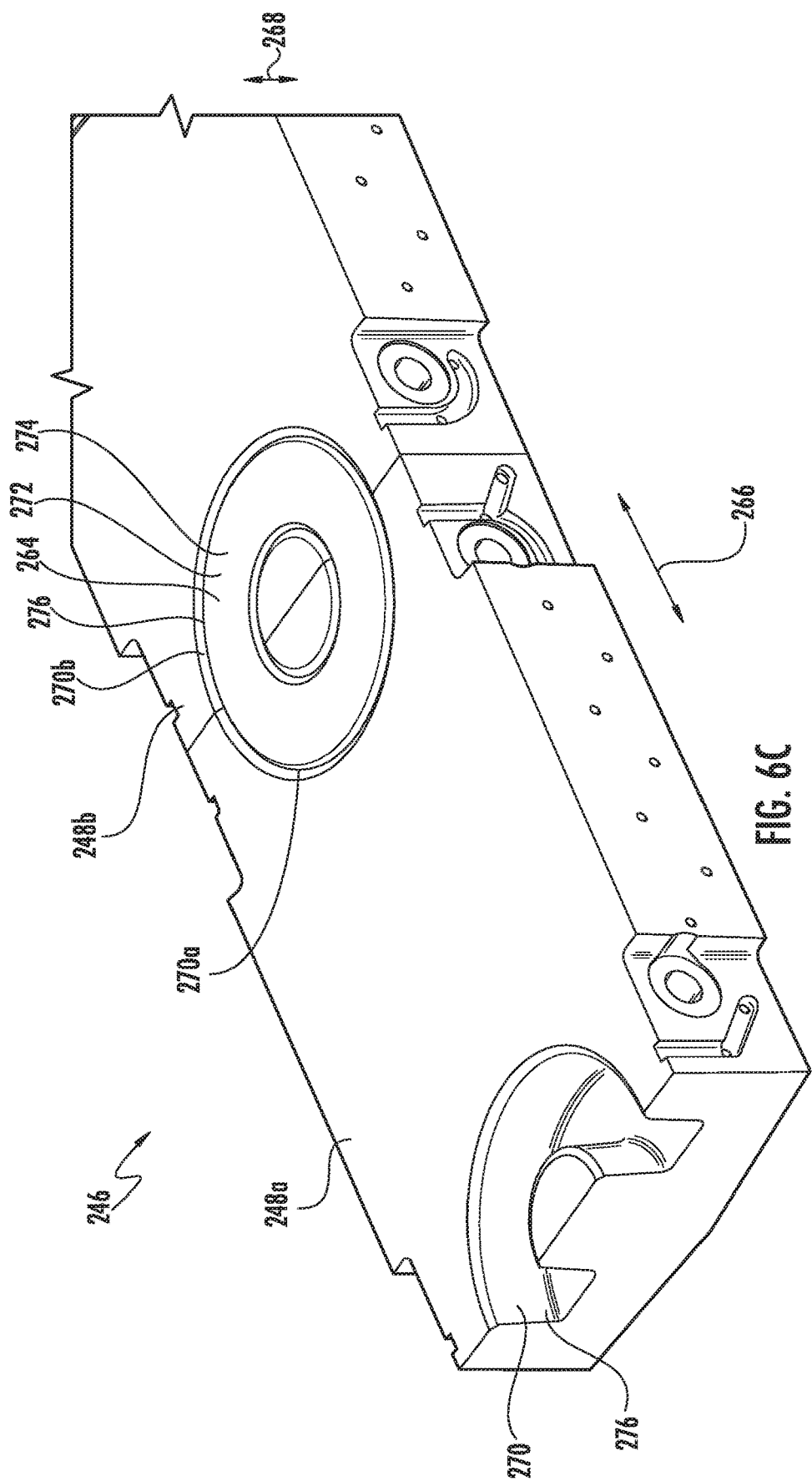

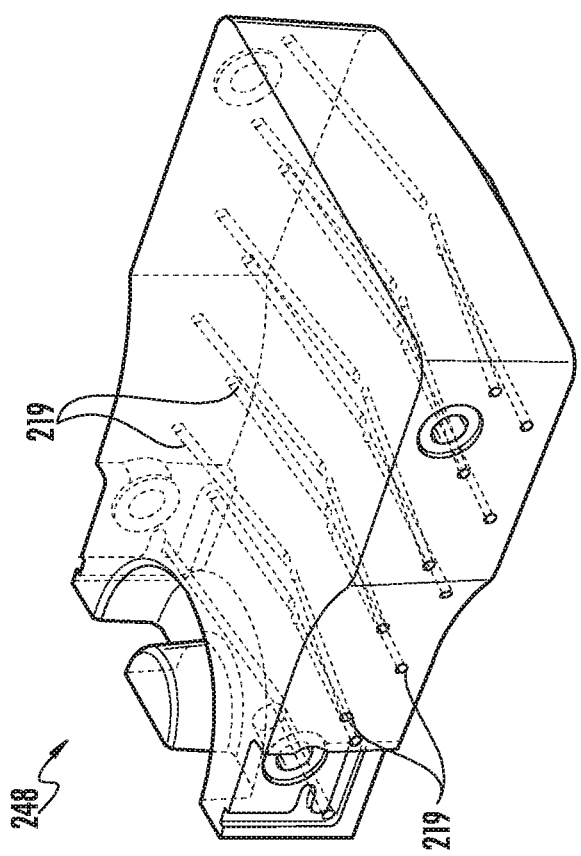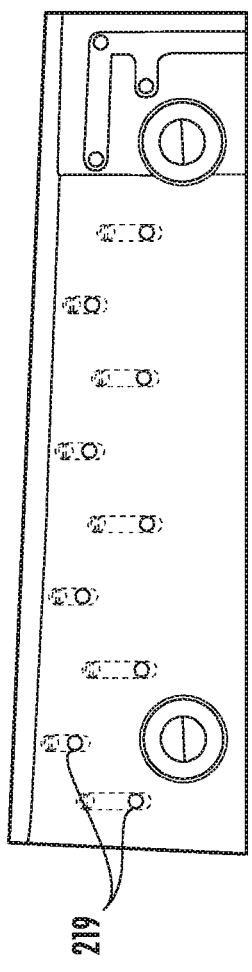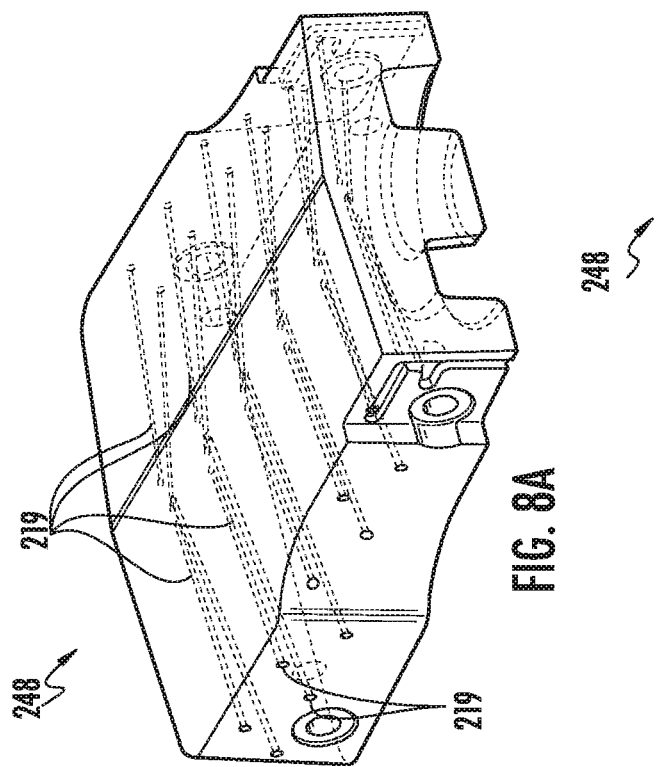

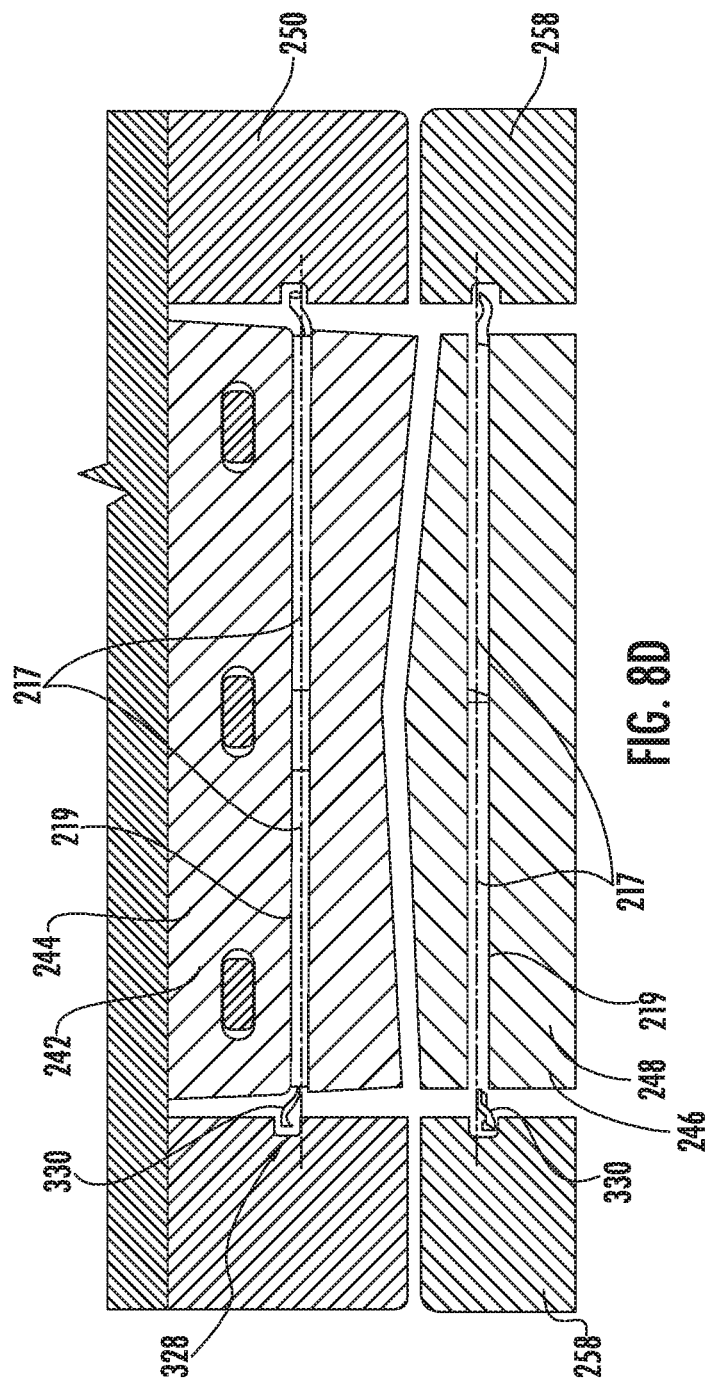

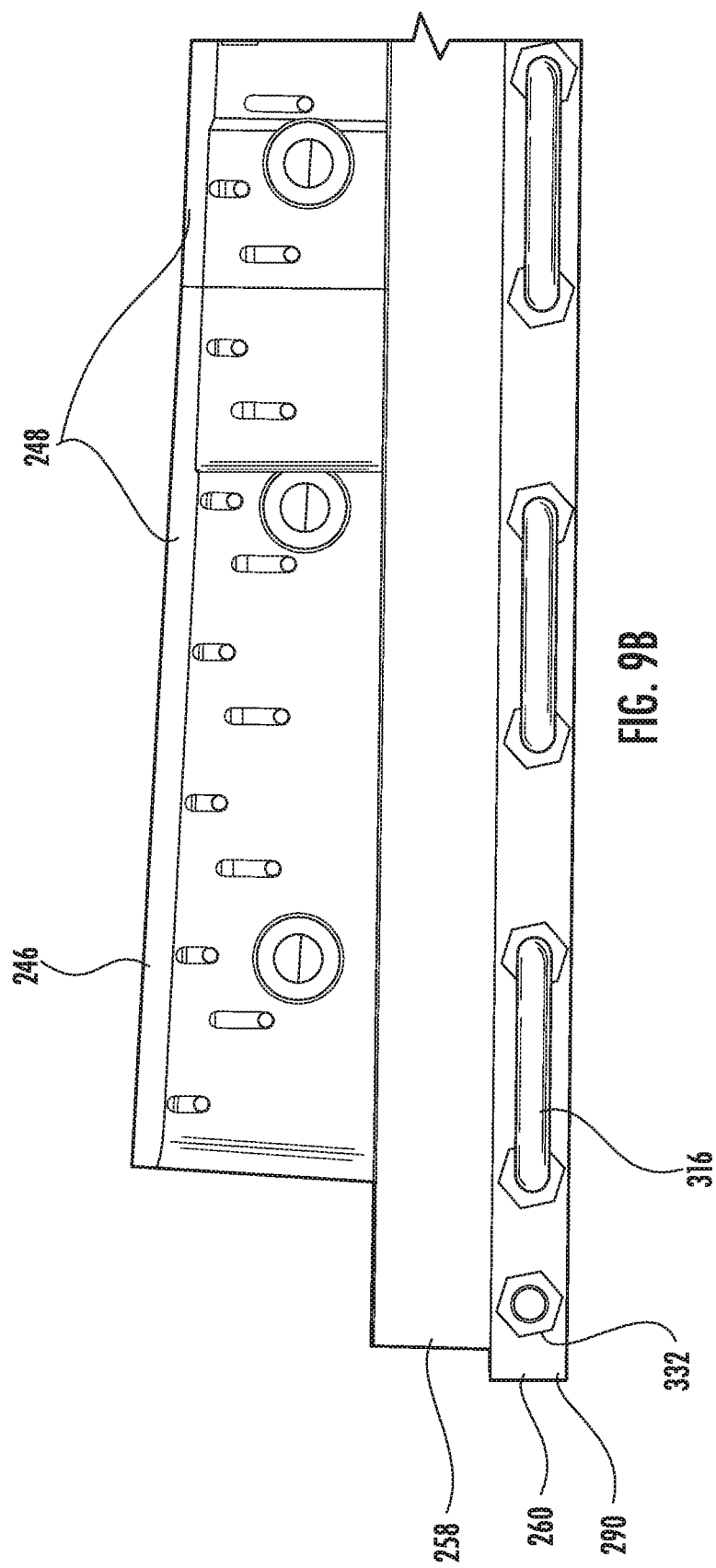

SEGMENTED DIE FOR FORMING FINISHED PARTS

FIELD

Embodiments described herein relate to a die, and more particularly to a segmented die for forming finished parts, and related devices, systems, and methods.

BACKGROUND

Finished parts for aircraft and other applications may be formed in a number of ways, including creep forming, milling, machining, or performing other processes on one or more blanks. As the size and complexity of these parts increase, conventional processes become less efficient and lead to increases in cost, complexity and production time. For example, forming a splice plate or other large angled part for a modern aircraft may require creep forming a relatively thick metal (e.g. titanium) blank and milling the finished part out of the blank, which results in more milling time, higher raw material costs, higher waste, and requires more capital and recurring costs. Thus, there is a need for improved devices, systems, and methods for forming finished parts for these and other applications.

SUMMARY

In accordance with an embodiment, a die assembly for forming finished parts from blanks comprises an upper die section comprising an upper segmented die comprising a plurality of upper die segments releasably coupled to each other. The die assembly further comprises a lower die section comprising a lower segmented die comprising a plurality of lower die segments releasably coupled to each other.

In accordance with an embodiment and any of the preceding embodiments, the plurality of upper die segments is arranged in a linear array. Each upper die segment comprises a coupling structure configured to releasably couple the upper die segment to an adjacent upper die segment. The coupling structure inhibits movement of the upper die segment with respect to the adjacent upper die segment in a longitudinal direction substantially parallel to the linear array. The coupling structure allows movement of the upper die segment with respect to the adjacent upper die segment in a transverse direction substantially orthogonal relative to the longitudinal direction.

In accordance with an embodiment and any of the preceding embodiments, for each upper die segment, the coupling structure comprises a groove formed in the upper die segment, wherein the groove of the upper die segment corresponds to the groove in an adjacent upper die segment of the plurality of upper die segments, and the upper die section further comprises a retainer structure configured to simultaneously engage with the grooves of at least two adjacent upper die segments to inhibit movement of the at least two adjacent upper die segments with respect to each other in the longitudinal direction.

In accordance with an embodiment and any of the preceding embodiments, the retainer structure comprises a ring-shaped element, and the grooves of the at least two adjacent upper die segments form a ring-shaped recess configured to releasably receive the ring-shaped element in the transverse direction to releasably couple the at least two adjacent upper die segments to each other.

In accordance with an embodiment and any of the preceding embodiments, the coupling structure of a first upper die segment of the plurality of upper die segments comprises a protrusion, the coupling structure of a second upper die segment of the plurality of upper die segments comprises a groove that corresponds to the protrusion of the first upper die segment, and the first upper die segment is configured to be lowered in the transverse direction into the linear array adjacent to the second upper die segment, wherein the groove of the second upper die segment releasably receives the protrusion of the first upper die segment to releasably couple the first upper die segments to the second upper die segment.

In accordance with an embodiment and any of the preceding embodiments, the die assembly further comprises a plurality of heating elements coupled to at least one of the upper segmented die or the lower segmented die, wherein the plurality of heating elements are configured to heat the at least one of the upper segmented die or the lower segmented die to at least a predetermined temperature.

In accordance with an embodiment and any of the preceding embodiments, the predetermined temperature is at least about 900 degrees F.

In accordance with an embodiment and any of the preceding embodiments, the plurality of heating elements are coupled to the upper segmented die and the lower segmented die to heat the upper segmented die and the lower segmented die to at least the predetermined temperature.

In accordance with an embodiment and any of the preceding embodiments, each upper die segment comprises a heating element recess, each lower die segment comprises a heating element recess, a respective heating element of the plurality of heating elements is disposed in each of the heating element recesses in each of the upper die segments and the lower die segments.

In accordance with an embodiment and any of the preceding embodiments, the die assembly further comprises a transfer plate releasably coupled to the upper segmented die, the transfer plate comprising an attachment point for an upper platen of a movable gantry press.

In accordance with an embodiment and any of the preceding embodiments, the die assembly further comprises an upper insulation subassembly comprising an upper insulation material disposed around the upper segmented die, and an upper cladding material disposed around an outer surface of the upper insulation material. The die assembly further comprises a lower insulation subassembly comprising a lower insulation material disposed around the lower segmented die, and a lower cladding material disposed around an outer surface of the lower insulation material.

In accordance with an embodiment and any of the preceding embodiments, the die assembly further comprises a chill plate thermally coupled to at least one of the upper insulation material or the lower insulation material to facilitate cooling the die assembly.

In accordance with an embodiment and any of the preceding embodiments, the chill plate further comprises exposed tubing for transporting a cooling fluid to facilitate cooling the die assembly.

In accordance with an embodiment and any of the preceding embodiments, the die assembly further comprises a plurality of fastener assemblies, wherein each fastener assembly is configured to releasably attach a respective upper die segment to the transfer plate.

In accordance with an embodiment and any of the preceding embodiments, each fastener assembly comprises a hanger pad and a hanger rod. Each upper die segment comprises a hanger pad recess for receiving a respective hanger pad, and a lower hole portion transverse to the hanger pad recess for receiving the hanger rod. The upper insulation subassembly comprises a plurality of upper hole portions corresponding to each of the lower hole portions of the upper die segments. Each hanger rod is configured to be inserted through a respective upper hole portion of the upper insulation subassembly and through a respective lower hole portion of a respective upper die segment to couple to the respective hanger pad of the fastener assembly in the hanger pad recess of the respective upper die segment, to releasably attach the transfer plate to the respective upper die segment.

In accordance with an embodiment and any of the preceding embodiments, a system for fabricating finished parts comprises a plurality of die assemblies located at a plurality of respective locations, each die assembly being configured to fabricate a respective finished part. Each die assembly comprises an upper die section comprising an upper segmented die comprising a plurality of upper die segments releasably coupled to each other, and a lower die section comprising a lower segmented die comprising a plurality of lower die segments releasably coupled to each other. The system further comprises a robot configured to move between the plurality of respective locations and selectively load blanks into the plurality of die assemblies, and a movable gantry press configured to move between the plurality of respective locations and selectively operate the plurality of die assemblies to form finished parts from the blanks.

In accordance with an embodiment and any of the preceding embodiments, a die for forming finished parts from blanks comprises a plurality of die segments arranged in a linear array. Each die segment of the plurality of die segments comprises a heating element recess for receiving a heating element to heat the die segment to at least a predetermined temperature, and a coupling structure configured to releasably couple the die segment to an adjacent die segment of the plurality of die segments.

In accordance with an embodiment and any of the preceding embodiments, for each die segment, the coupling structure inhibits movement of the die segment with respect to the adjacent die segment in a longitudinal direction substantially parallel to the linear array. For each die segment, the coupling structure allows movement of the die segment with respect to the adjacent die segment in a transverse direction substantially orthogonal relative to the longitudinal direction.

In accordance with an embodiment and any of the preceding embodiments, for each die segment, the coupling structure of the die segment comprises a groove formed in the die segment, wherein the groove of each die segment corresponds to the groove of an adjacent die segment. The groove of the die segment and corresponding groove of the adjacent die segment are configured to simultaneously engage with a retainer structure to inhibit movement of the die segment and the adjacent die segment with respect to each other in the longitudinal direction.

In accordance with an embodiment and any of the preceding embodiments, for each die segment, the groove of the die segment and the groove of the adjacent die segment form a ring-shaped recess configured to releasably receive a ring-shaped element in the transverse direction to releasably couple the die segment to the adjacent die segments.

BRIEF DESCRIPTION OF THE DRAWINGS

FIG. 4B is a perspective view of perspective views of components of the die assembly of FIG. 4A, with the upper and lower insulation subassemblies removed;

FIGS. 5A and 5B are cross-sectional views components of the system of FIGS. 2A and 2B;

FIGS. 6A-6C are views of the segmented die of FIGS. 3A-5B, and coupling structures for removably coupling the lower die segments to each other;

FIGS. 8A-8D are views of a die segment of the die assembly of FIGS. 3A-6C illustrating heating element recesses for receiving and housing heating elements for heating the die segment;

FIGS. 9A and 9B are views of a cooling subassembly of the die assembly of FIGS. 3A-8D, for providing cooling and regulating temperature for the segmented die.

DETAILED DESCRIPTION

Embodiments described herein relate to a die, and more particularly to a segmented die for forming finished parts, and related devices, systems, and methods.

Figure 1:
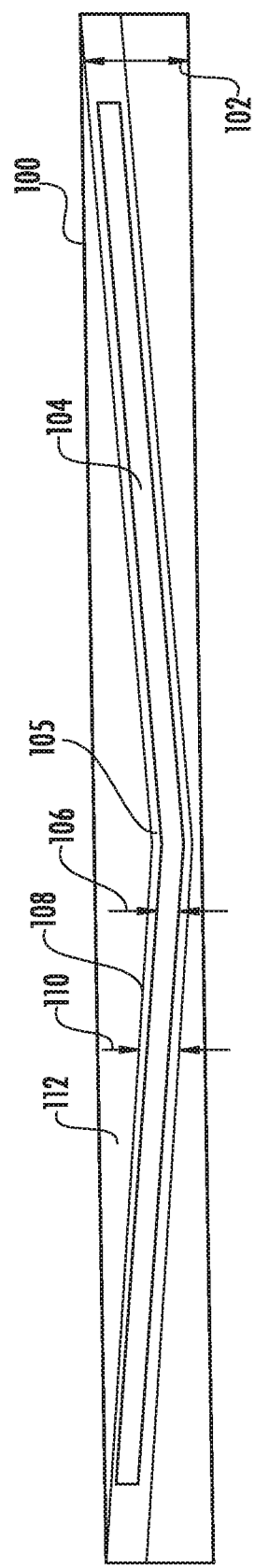
FIG. 1 is a cross-sectional view comparing a blank for forming a finished part according to an embodiment with a conventional blank for forming the finished part.

In this regard, FIG. 1 is a cross-sectional view comparing a blank 108 for forming a finished part 104 according to an embodiment with a conventional blank 100 for forming the finished part. The conventional blank 100 has a first thickness 102 for forming the finished part 104, e.g., a splice plate for an aircraft in this example. In this embodiment, the conventional blank 100 is made of a metal, metal alloy, or other material. To form the finished part 104 having a desired shape 105 and thickness 106, the conventional blank 100 is typically milled (e.g., with a computer numerical control (CNC) machine) to remove excess material 112, which may be discarded as waste or recycled. According to embodiments herein, the finished part 104 may be formed using a blank 108 having a second thickness 110 that is significantly smaller than the first thickness 102 of the conventional blank 100. Rather than machining a larger conventional blank 100, the thinner blank 108 may be compressed in a heated die assembly using a gantry press (See FIGS. 2A and 2B) to deform the blank 108 into the finished part 104 having the desired shape 105 and thickness 106. In this example, the blank 108 is a titanium blank and the finished part 104 is a part for an aircraft, which can result in substantial material savings and machine time savings per finished part 104 over conventional processes that employ larger conventional blanks 100.

Using a gantry press and heated die assembly becomes difficult, however, as the size of the finished part 104 increases. For example, conventional die assemblies may be unsuitable for forming large aircraft parts such as the finished part 104, which may have large sizes and complex shapes and profiles. By using the embodiments described herein, however, large parts with complex profiles, such as the finished part 104, may be formed using a gantry press and heated die assemblies, which in turn employ the segmented dies described herein, which allows much smaller and thinner blanks 108 to be used. Additional benefits include significant cost savings, a significantly larger ratio of material in the finished part, less milling time, lower total raw material costs, less waste. Reducing milling time also significantly decreases manufacturing flow times, CNC loads, labor requirements, and consumption of perishable tools. Many of the embodiments described herein may be partially or fully automated, resulting in a reduction in worker injuries and worker stress, and an increase in worker productivity.

Figure 2A:
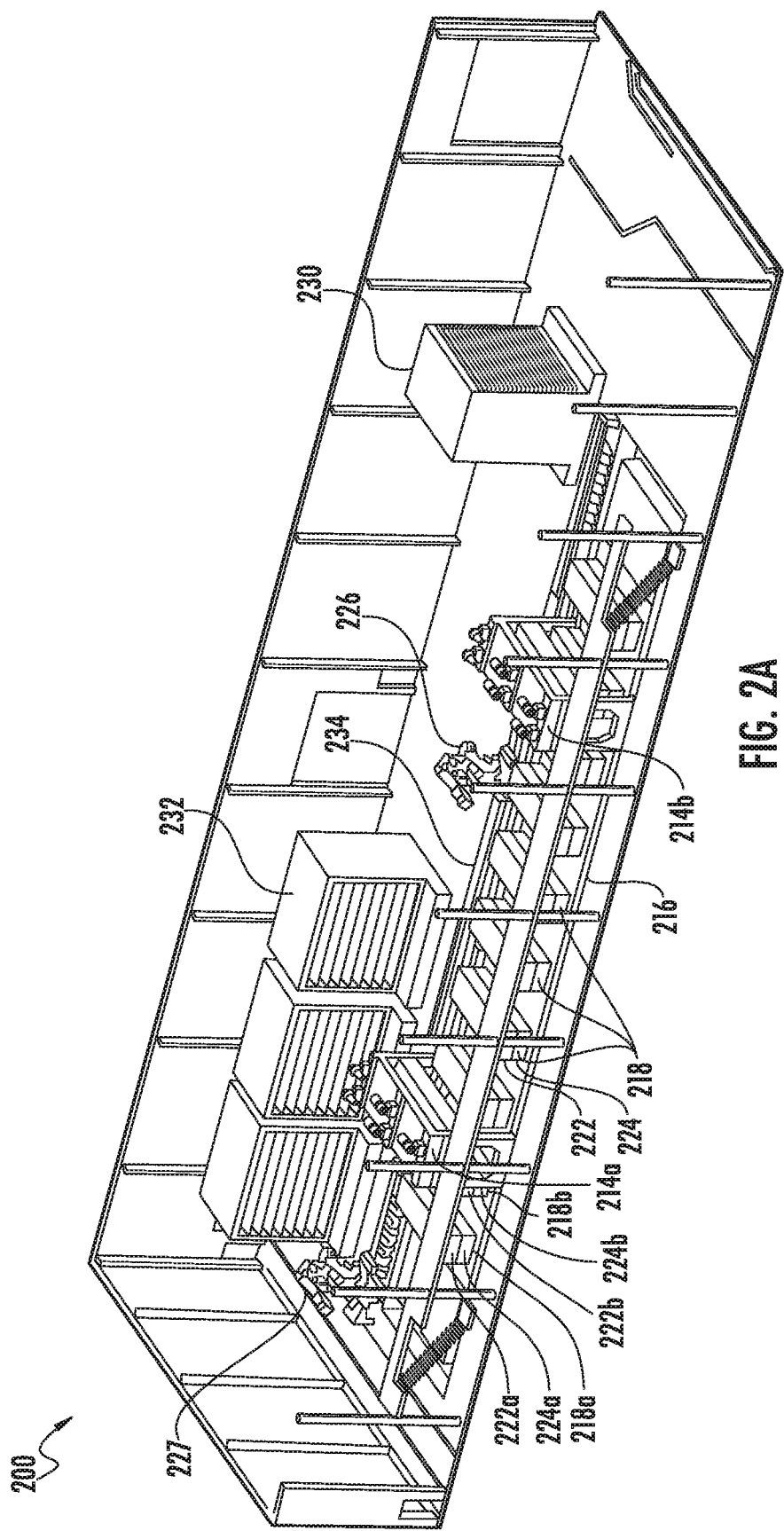
FIGS. 2A and 2B are respective perspective and schematic views of a system for forming finished parts using a movable gantry press and a plurality of die assemblies, according to an embodiment.
Figure 2B:
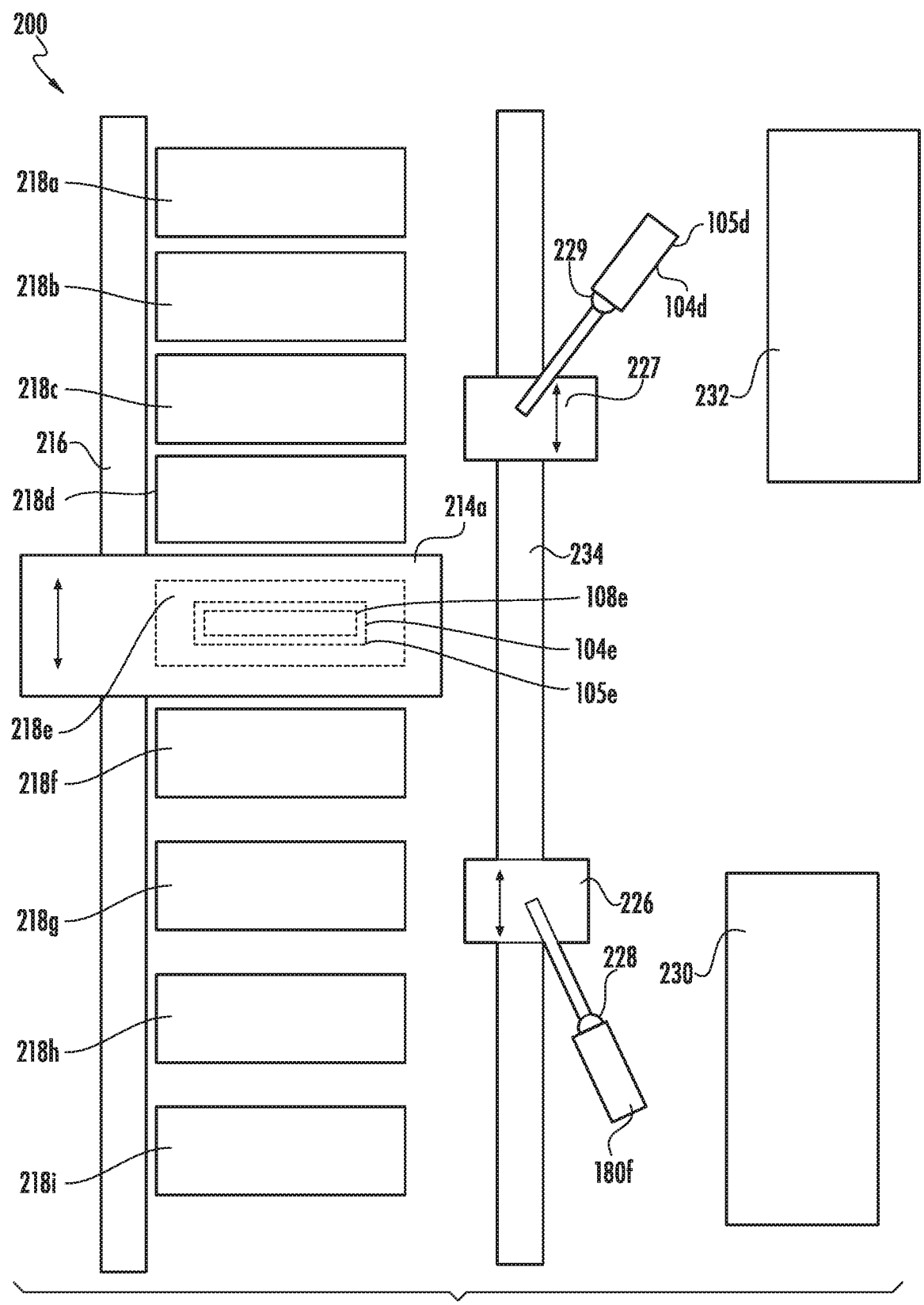

Before describing the segmented dies in greater detail, reference will be made to the operating environment for the segmented dies. In this regard, FIGS. 2A and 2B illustrate schematic views of a system 200 for forming finished parts using a movable gantry press and a plurality of stationary die assemblies employing segmented dies, according to an embodiment. As used herein, the term stationary does not mean that the die assemblies 218 are not movable, rather stationary means that the die assemblies 218 are maintained at a predetermined location during the fabrication of the finished parts 104 and the movable gantry press 214 is configured to move to the predetermined location of the die assemblies 218 rather than the die assemblies 218 being transported to the location of the gantry press as is done in some known systems. It should therefore be realized that the die assemblies 218 may be placed at any desired position to optimize the fabrication of the various finished parts 104. In this example, the system 200 is configured to form titanium parts for large commercial aircraft, but it should be understood that these and other embodiments may be used with a wide variety of materials and for a wide variety of applications. The system 200 includes at least one movable gantry press 214 that is selectively movable along a press rail system 216 between a plurality of self heating die assemblies 218a-218i (see FIG. 2B). The self-heating features of the die assemblies 218 are discussed in greater detail below with respect to FIGS. 5A and 5B. In this example, the system 200 includes multiple movable gantry presses 214a, 214b, which may independently move between different die assemblies 218 and operate multiple die assemblies 218 simultaneously, thereby increasing efficiency and utilization of the system 200. In this example, each movable gantry press 214 is a dual gantry 580-ton electric ballscrew press. An electric press has the advantage of being more mobile than a conventional hydraulic press, which generally use hydraulic supply and are typically designed to be stationary.

Because the die assemblies 218 are extremely large and heavy in comparison to conventional die assemblies, the die assemblies 218 are configured to be stationary and the movable gantry press 214 moves between the different die assemblies 218. The different die assemblies 218 may be configured to form different parts, or the same part, as desired. Another advantage of using multiple stationary die assemblies 218 is that each die assembly can be continuously heated, which reduces temperature-based wear and damage on the die assemblies 218 resulting from heating, cooling, and re-heating, which may reduce the service life of the die assemblies 218. This heating, cooling, and re-heating process can also be time-consuming, due to the large size and mass of the die assemblies 218. By keeping the die assemblies 218 continuously heated, the die assemblies 218 may be constantly available for use, without the need for a lengthy heat-up or cool-down period before or after using the die assembly 218.

Moreover, because the movable gantry press 214 is not required to be permanently or continuously coupled to any of the die assemblies 218, the die assemblies 218 can be maintained at extremely high temperatures without subjecting the movable gantry press 214 to these temperatures for extended periods of time. For example, in this embodiment, components of the die assemblies 218, and particularly the upper and lower segmented dies of the die assemblies 218 (described in greater detail with respect to FIGS. 3A-5B below), are configured to be continuously heated at temperatures of at least 900 degrees F., and specifically in the range of 900 to 1350 degrees F., which is a desirable temperature range for hot-forming titanium parts, which are widely used in aircraft applications. By moving the movable gantry press 214 between the different die assemblies 218 and removably coupling the movable gantry press 214 to a particular die assembly 218 during use of the die assembly 218, the die assemblies 218 can be maintained in a continuously heated state at stationary positions without causing unnecessary temperature-based wear and damage to the movable gantry press 214.

An upper platen (not shown) of the movable gantry press 214 is configured to, for each die assembly 218, releasably couple to the upper die section of the die assembly 218 and an actuator (not shown) of the movable gantry press 214 is configured to, for each die assembly 218, selectively compress a blank 108 between the upper die section and the lower die section of the die assembly to deform the blank into a finished part 104 comprising a desired shape.

As best shown in FIG. 2B, robots 226, 227 are used to move the blanks 108 and finished parts 104 into and out of the die assemblies 218. One example of a suitable robot is a 6-axis long arm robot, but it should be understood that different robots may be used, as desired. In this example, a first robot 226 uses a first end effector 228 to retrieve the blank 108 from a raw material rack 230 and place the blank 108 between the upper die section 222 and the lower die section 224 (see FIGS. 3A-3F) of the die assembly 218. After the finished part 104 has been formed, a second robot 227 uses a second end effector 229 configured to remove the finished part 104 from between the upper die section 222 and the lower die section 224 of the die assembly 218 and place the finished part 104 on a cooling rack 232 to cool. In this example, the robots 226, 227 are movable along a robot rail system 234. It should be understood that any number of robots may be used, with each robot including one or more end effectors for transporting the blanks 108, finished parts 104, or both. In the embodiment of FIGS. 2A and 2B, the first robot 226 and second robot 227 have different functions and can move independently of each other, allowing the first robot 226 to begin carrying and loading a blank into one die assembly 218 while the second robot simultaneously finished removing a finished part from another die assembly 218, thereby increasing system efficiency. In another embodiment, a single robot includes a single end effector that performs the functions of both the first end effector 228 and the second end effector 229, i.e., transporting both the blanks 108 and the finished parts 104. In another embodiment, the first robot includes the first end effector 228 configured to handle the room-temperature blanks 108 and the second end effector 229 configured to handle the higher-temperature finished parts 104.

In the view shown by FIG. 2B, operation of the movable gantry press 214a is illustrated. For simplicity, movable gantry press 214b is not shown, but in this embodiment, both movable gantry presses 214 operate interchangeably with the plurality of die assemblies 218, so that multiple die assemblies 218 can be used simultaneously. In the view shown by FIG. 2B, the second robot 227 is transporting a finished part 104d (having a desired shape 105d) from the previously used die assembly 218d to the cooling rack 232. The movable gantry press 214a is operating die assembly 218e to compress a blank (not shown), which was previously loaded into the into the die assembly 218e by the first robot 226, to form the finished part 104e. When the finished part 104e has been formed, the second robot 227 will remove the finished part 104e from the die assembly 218e and transport the finished part 104e to the cooling rack 232. Meanwhile, the first robot 226 in this view is transporting the next blank 108f to be loaded into the an adjacent die assembly 218f after the gantry press 214a has moved from the die assembly 218e to the adjacent die assembly 218f. After the next blank 104f is loaded into the die assembly 218f, the gantry press 214a will operate the die assembly 218f to compress the blank 108f into a finished part (not shown), and so on.

In this example, the different die assemblies 218 produce different finished parts 104 having different shapes 105. For example, the shape 105d of the finished part 104d formed using the die assembly 218d is different than the shape 105e of the finished part 104e formed using the die assembly 218e. This has the advantage of increasing efficiency and utilization of the system 200 so that different finished parts 104 can be produced simultaneously and at different rates, as desired. In an alternate embodiment, the die assemblies 218 all produce the same finished parts 104 having the same shapes 105, which has the advantage of increasing output volume and speed for the system 200.

Figure 3A:
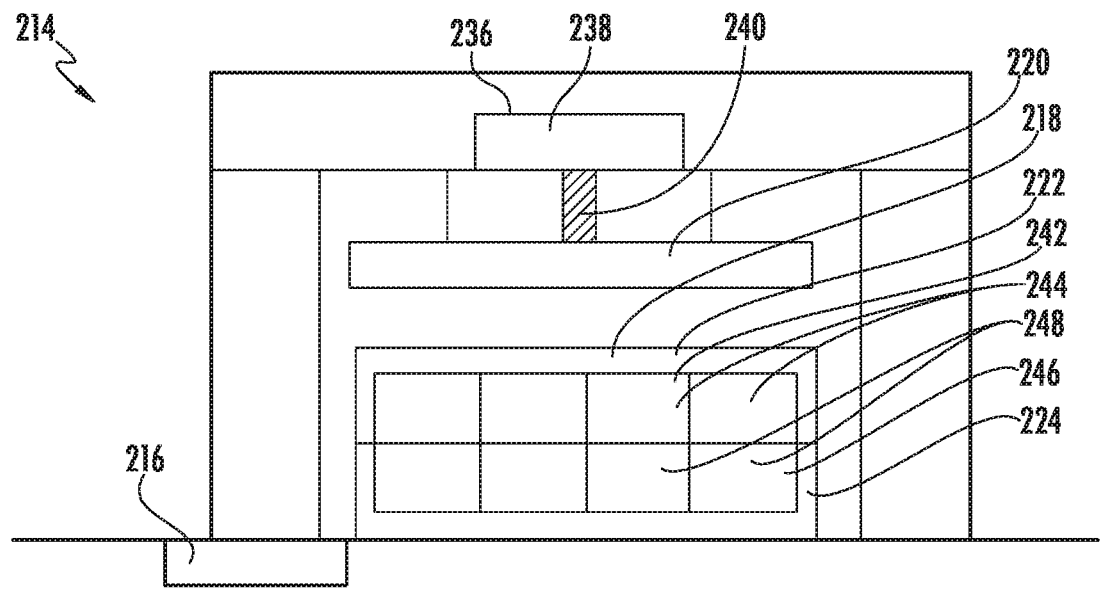
FIGS. 3A-3F are simplified schematic views illustrating operation of the movable gantry press of the system of FIGS. 2A and 2B.
Figure 3B:
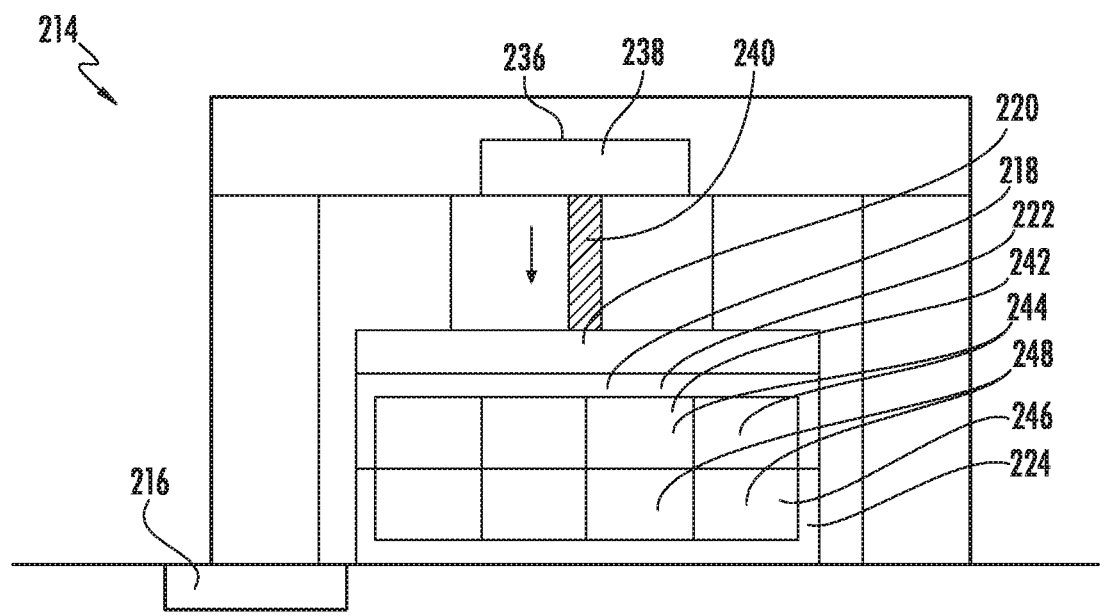
Figure 3C:
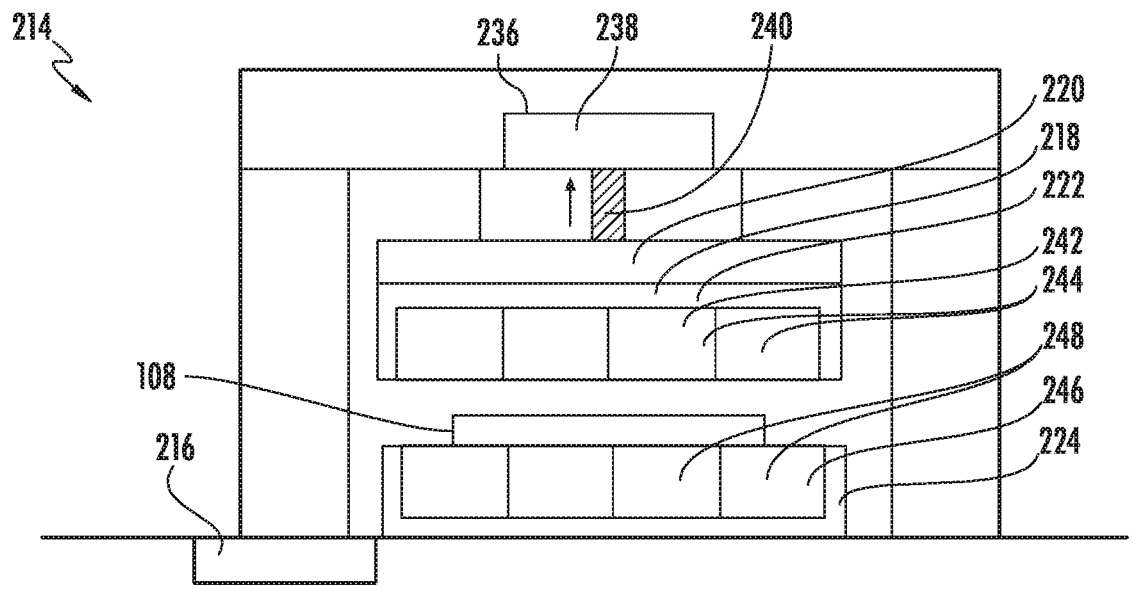

As noted above, using a movable gantry press 214 and heated die assembly 218 to form larger parts presents special challenges, such as forming suitably large dies for forming these larger parts. To address this problem, the die assembly 218 includes a segmented die formed from a linear array of die segments. In this regard, FIGS. 3A-3F are simplified schematic views illustrating operation of system 200 using the movable gantry press 214 of FIGS. 2A and 2B, to form finished parts using one of the segmented die assemblies 218, according to an embodiment. FIG. 3A illustrates one of the movable gantry presses 214 being positioned along a press rail system 216 above a heated die assembly 218. In FIG. 3B, an upper platen 220 of the movable gantry press 214 is lowered onto the upper die section 222 of the die assembly 218 and is releasably coupled to the upper die section 222. In FIG. 3C, the upper platen 220 is raised, lifting the upper die section 222 away from the lower die section 224, and a blank 108 is placed on the lower die section 224 under the upper die section 222.

Figure 3D:
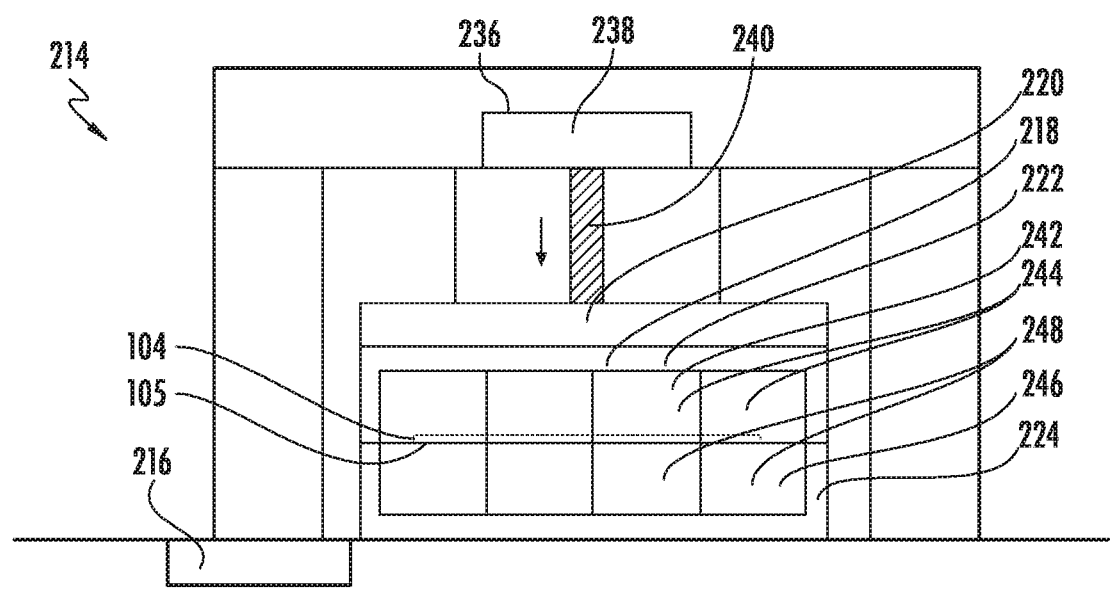
Figure 3E:
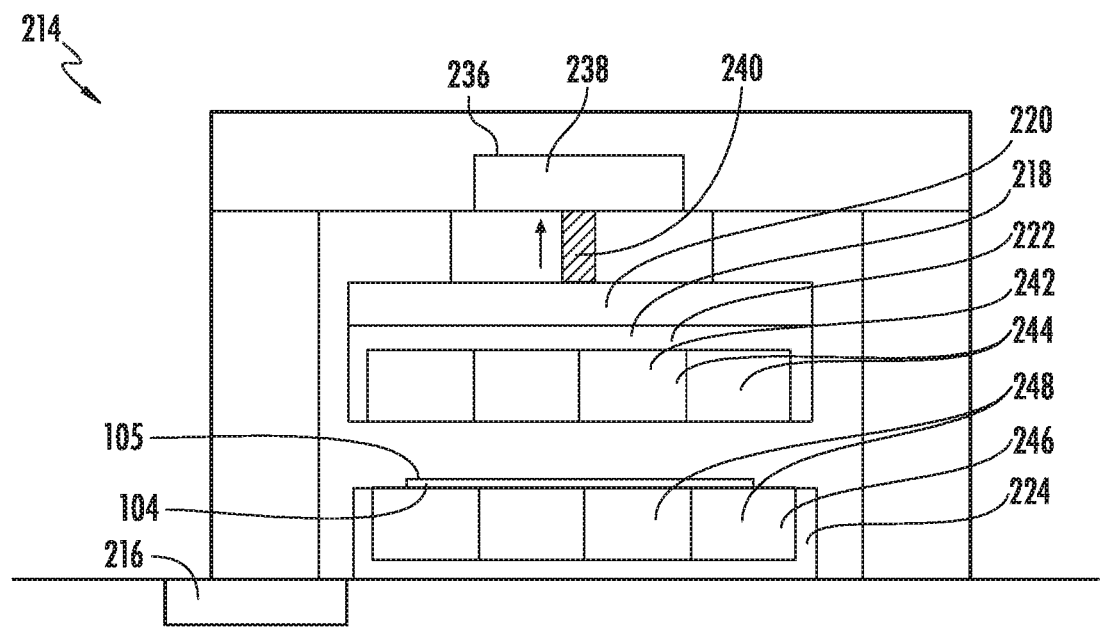
Figure 3F:
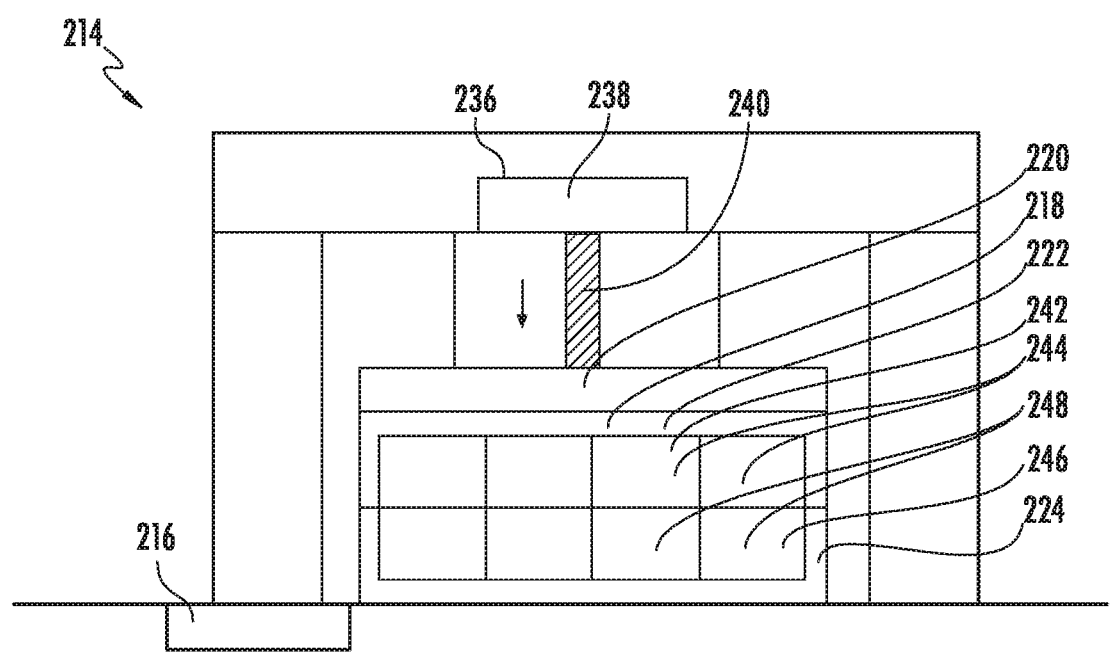

In FIG. 3D, the upper platen 220 is lowered, and an actuator 236 applies downward force to the upper die section 222 to compress and deform the blank 108 between the heated upper die section 222 and lower die section 224 to form the finished part 104 having a desired shape 105. In this example, the actuator 236 includes an electric motor 238 that drives a ballscrew 240 (also referred to as a roller screw) to apply the downward force on the upper die section 222. As discussed above, using an electric motor 238 has some advantages over conventional hydraulic press components, such as greater mobility, greater heat resistance, and increased efficiency and reliability as the sizes of the components increase. In FIG. 3E, the upper platen 220 lifts the upper die section 222 away from the lower die section 224 to allow the finished part 104 to be removed from the die assembly 218. In FIG. 3F, the upper platen 220 then lowers the upper die section 222 onto the lower die section 224 and decouples from the upper die section 222 so that the movable gantry press 214 can traverse along the press rail system 216 to another die assembly 218.

As will be discussed in greater detail below with respect to FIG. 5A, the upper die section 222 includes an upper segmented die 242 (which may also be referred to as a punch block) having a plurality of upper die segments 244 coupled to each other in a linear array. Similarly, the lower die section 224 includes a lower segmented die 246 (which may also be referred to as a die block) having a plurality of lower die segments 248 coupled to each other in a linear array. As the actuator 236 applies force to the upper die section 222, the upper die segments 244 act together to press toward the lower die segments 248, which also act together to compress the blank 108 therebetween to form the finished part 104.

Figure 4A:
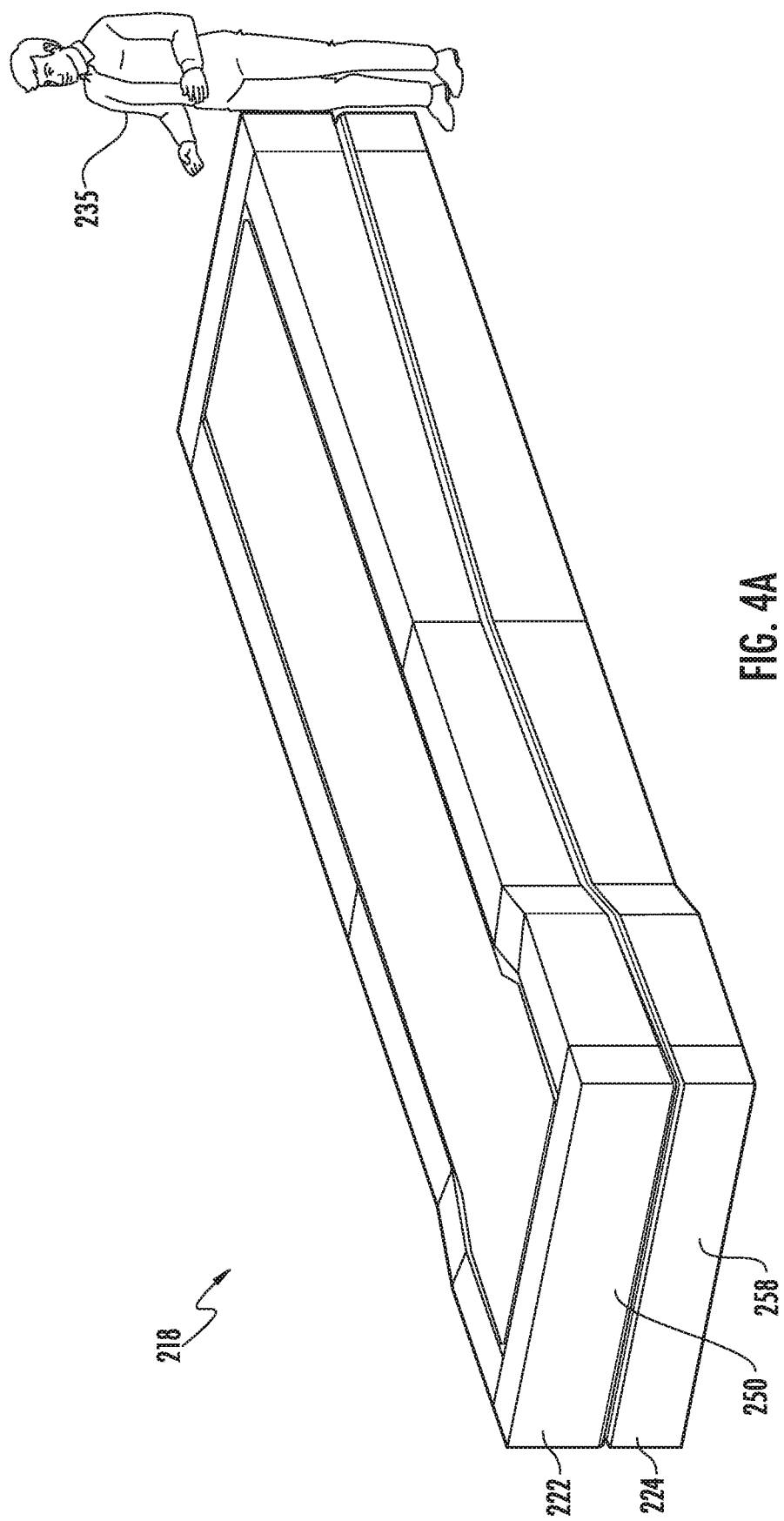
FIG. 4A is a perspective view of perspective views of components of a die assembly of the system of FIGS. 2A and 2B.

Referring now to FIGS. 4A and 4B, perspective views of components of a die assembly 218 of the system 200 of FIGS. 2A and 2B are illustrated. For large applications, each die assembly 218 can weigh in excess of 20,000 pounds. For example, as shown in FIG. 4A, the die assembly 218 of this embodiment for forming large aircraft parts, shown with a human 235 for scale, is more than 25 inches thick, more than 250 inches long, and weighs over 35,000 pounds. The upper die section 222 includes an upper segmented die 242 (e.g., punch block) housed within an upper insulation subassembly 250, and the lower die section 224 includes a lower segmented die 246 (e.g., die block) housed within a lower insulation subassembly 258.

Referring now to FIG. 4B, the upper segmented die 242 and the lower segmented die 246 are illustrated with the upper insulation subassembly 250 and lower insulation subassembly 258 of FIG. 4A removed. The upper segmented die 242 includes a plurality of upper die segments 244 and the lower segmented die 246 includes a plurality of lower die segments 248, arranged in a linear array 262. The upper die segments 244 are removably coupled to each other by a plurality of coupling structures 264. The lower die segments 248 are removably coupled to each other by a plurality of coupling structures (not shown). In this example, each coupling structure 264 comprises a pair of grooves 270 that form a ring-shaped recess 276 when adjacent upper die segments 244 are arranged in the linear array 262. The ring-shaped recess 276 receives a corresponding retainer structure 272, which is a ring-shaped element 274 in this example. The ring-shaped element 274 is removably inserted into the ring-shaped recess 276 in a transverse direction 268 substantially perpendicular to the longitudinal direction 266 of the linear array 262 and prevents movement of the upper die segments 244 with respect to each other in the longitudinal direction 266. Each upper and lower die segment 244, 248 further includes a plurality of heating element recesses 219 for receiving and housing a plurality of heating elements (not shown), for heating the upper segmented die 242 and lower segmented die 246 to a desired temperature range.

Figure 5A:
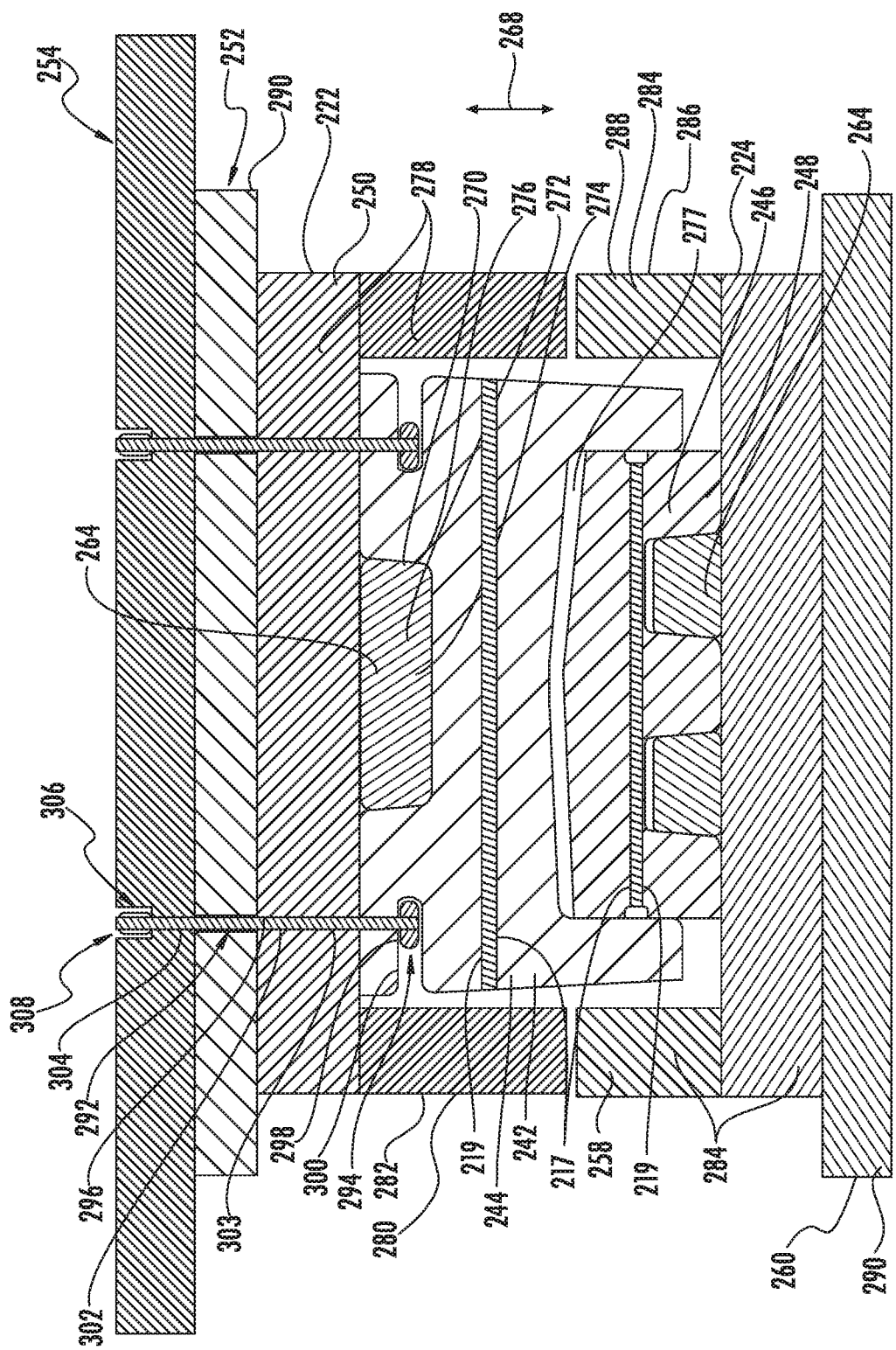

Referring now to FIGS. 5A and 5B, more detailed cross-sectional views of components of the systems 200 of FIGS. 2A-4B are illustrated. The die assembly 218 includes an upper die section 222 and a lower die section 224. The upper die section 222 includes an upper segmented die 242 and an upper insulation subassembly 250 configured to provide insulation for the heated upper die segments 244 of the upper segmented die 242. The upper die section 222 includes an upper cooling subassembly 252 configured to cool excess heat from the upper insulation subassembly 250, and a transfer plate 254 configured to be removably coupled to an upper platen 220 of a movable gantry press 214 (see FIG.

5B). The lower die section 224 includes a lower segmented die 246, a lower insulation subassembly 258, and a lower cooling subassembly 260.

As shown by FIG. 5A, the upper segmented die 242 includes a plurality of upper die segments 244 coupled to each other via a plurality of coupling structures 264. In this example, each coupling structure 264 comprises a retainer structure 272 forming a ring-shaped element 274 that is received in corresponding grooves 270 forming a ring-shaped recess 276. The lower segmented die 246 includes a plurality of lower die segments 248 coupled to each other via another plurality of coupling structures 264. Each upper and lower die segment 244, 248 includes a plurality of heating element recesses 219 for receiving and housing a plurality of heating elements 217.

The upper insulation subassembly 250 and lower insulation subassembly 258 include a respective upper insulation material 278 and lower insulation material 284 that substantially enclose the upper segmented die 242 and lower segmented die 246 when the die assembly 218 is in a closed configuration, i.e., with the upper segmented die 242 and lower segmented die 246 closed around a mold cavity 277. In general, the upper segmented die 242 and lower segmented die 246 will be opened only to place a blank or remove a finished part from the mold cavity 277. By substantially enclosing the upper segmented die 242 and lower segmented die 246 when in the closed configuration, the upper segmented die 242 and lower segmented die 246 can retain heat for longer periods, thereby requiring less energy to keep the upper segmented die 242 and lower segmented die 246 heated.

To protect the upper insulation material 278 and lower insulation material 284, an upper cladding material 280 is disposed on an outer surface 282 of the upper insulation material 278, and a lower cladding material 286 is disposed on an outer surface 288 of the lower insulation material 284.

In this example, the upper cooling subassembly 252 and the lower cooling subassembly 260 each include a chill plate 290 to protect the respective transfer plate and support surface (e.g., a facility floor or platform) from temperature-based wear and damage. The chill plates 290 can also be used to selectively regulate the temperature of the upper segmented die 242 and lower segmented die 246, as desired. As shown by FIG. 5B, each chill plate 290 includes exposed tubing 316 for holding and transporting a cooling fluid 318 therethrough.

In this example, the upper die section 222 is coupled together via a plurality of fastener assemblies 292. In this example, each fastener assembly 292 includes a hanger pad 294 that is disposed in a hanger pad recess 298. Each hanger pad recess 298 includes a slot 300 that is substantially coplanar with the longitudinal direction (not shown) and a hole 302 extending in the transverse direction 268 substantially orthogonal to the longitudinal direction and the slot 300. A hanger rod 296 extends through the hole 302 and is coupled to the hanger pad 294 through an upper hole portion 303 of the hole 302 extending through one of the upper die segments 244 and a lower hole portion 304 of the hole 302 extending through the upper insulation subassembly 250, the upper cooling subassembly 252, and the transfer plate 254. A washer stackup 306 and threaded retaining nut 308 at the top end of the hanger rod 296 prevents movement of the components of the upper die section 222 with respect to each other in the transverse direction 268 and allows the transfer plate 254 to lift the entire upper die section 222. In this manner, the transfer plate 254 and upper insulation subassembly 250 is releasably coupled to the upper segmented die 242.

FIG. 5B illustrates the upper platen 220 of the movable gantry press 214 removably coupled to the transfer plate 254 of the upper die section 222. A plurality of clamping elements 314 of the upper platen 220 engage a plurality of respective attachment points 310 of the transfer plate 254 to removably couple the transfer plate 254 to the upper platen 220, thereby allowing the movable gantry press 214 to selectively raise and lower the upper die section 222.

Referring now to FIGS. 6A-6C, coupling structures for removably coupling die segments of the lower segmented die 246 (e.g., die block) of FIGS. 3A-5B to each other are illustrated in greater detail. As shown by FIG. 6A, the lower segmented die 246 includes a plurality of lower die segments 248 arranged in a linear array 262 in a longitudinal direction 266. Referring now to FIG. 6B, an inverted isometric view of the segmented die 246 of FIG. 6A illustrates a plurality of coupling structures 264 configured to releasably couple the lower die segments 248 to each other. Each coupling structure 264 is configured to releasably couple a lower die segment 248 to an adjacent lower die segment 248 in the linear array 262, to inhibit movement of the lower die segments 248 with respect to each other in the longitudinal direction 266, i.e., in a direction parallel to the direction of the linear array 262. At the same time, the coupling structure 264 allows movement of the lower die segment 248 with respect to the adjacent lower die segment 248 in a transverse direction 268 substantially orthogonal relative to the longitudinal direction 266, thereby allowing the segmented die 246 to be easily disassembled, for example to replace or repair individual lower die segments 248. It should also be understood that these and other features are also used with other segmented dies, including the upper segmented die 242 (e.g., punch block) of FIG. 4B, as described herein.

As shown in FIG. 6B and in greater detail in FIG. 6C, each coupling structure 264 includes a groove 270 formed in the lower die segment 248 that corresponds to a groove 270 in the adjacent lower die segment 248. A retainer structure 272 is configured to simultaneously engage with the grooves 270 of two (or more) adjacent lower die segments 248 to inhibit movement of the adjacent lower die segments 248 with respect to each other in the longitudinal direction 266, e.g., during operation of the die assembly 218 by the movable gantry press 214 of FIGS. 2A-2B. As shown in greater detail by FIG. 6C, the retainer structure 272 is a ring-shaped element 274, and the grooves 270a, 270b of adjacent lower die segments 248a, 248b form a ring-shaped recess 276 configured to releasably receive the ring-shaped element 274 in the transverse direction 268 to releasably couple the adjacent lower die segments 248a, 248b to each other. One advantage of these features is that the lower die segments 248 may be freely arranged and moved with respect to each other prior to coupling, and may be easily removed and replaced within the linear array 262 without the need to move the other lower die segments in the linear array 262.

Figure 7:
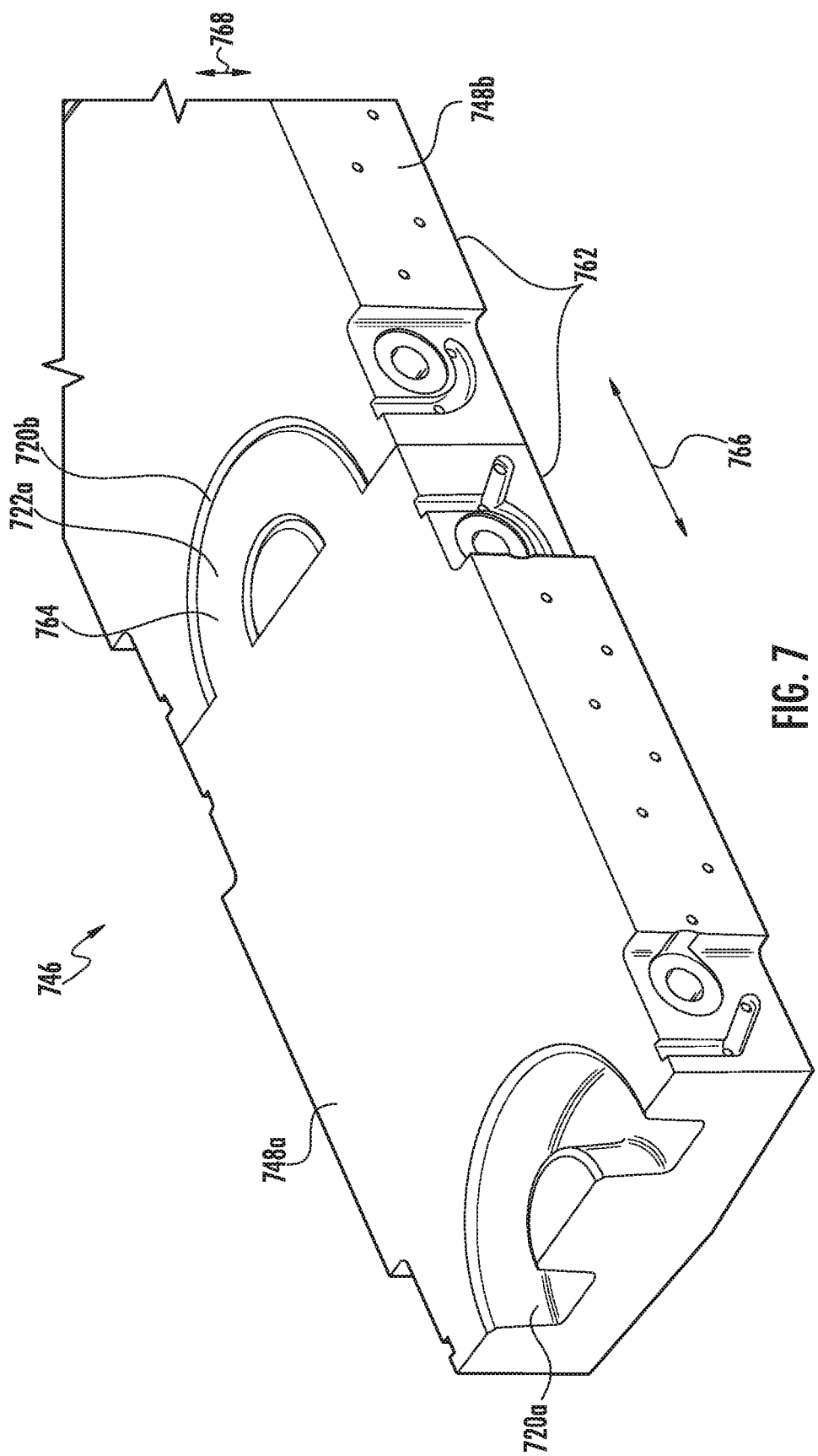
FIG. 7 is a view of another coupling structure for a segmented die similar to the segmented dies of FIGS. 3A-6C, according to another embodiment.

Other types of coupling structures may be used as well. For example, FIG. 7 is a view of another coupling structure 764 for a lower segmented die 746 similar to the lower segmented die 246 of FIGS. 3A-6C, according to an embodiment. In this example, the lower segmented die 746 is interchangeable with the lower segmented die 246 in the system 200 of FIGS. 2A-2B, and is identical to the lower segmented die 246 of FIGS. 3A-6C except as described below. In this embodiment, as with the embodiment of FIGS. 6A-6C, above, these features are also used with other segmented dies, including an upper segmented die (not shown) having similar features to the upper segmented die 242 (e.g., punch block) of FIG. 4B, as described above.

In this example, the lower segmented die 746 includes a plurality of lower die segments 748 arranged in a linear array 762. Each lower die segment 748 includes a groove 720 at one end and a protrusion 722 at the opposite end in the longitudinal direction 766 that corresponds to the groove 720 of an adjacent lower die segment 748. It should also be understood that, in some alternate embodiments, some lower die segments 748 include one or more grooves 720 only or one or more protrusions 722 only, as desired. Each lower die segment (e.g., die segment 748a) having a groove 720 is configured to be lowered in the transverse direction 768 into the linear array 762 adjacent to another lower die segment (e.g., die segment 748b) so that the groove 720b of the die segment 748b releasably receives the protrusion 722a of adjacent die segment 748a to releasably couple the adjacent die segments 748a, 748b to each other. One advantage of this embodiment is that the lower die segments 748 self-couple without the need for a separate retainer structure, such as the retainer structure 272 of FIGS. 6A-6C above.

As discussed above, it is desirable in these embodiments for the segmented dies, such as the segmented dies 242, 246 described above, to be heated, to facilitate forming the finished parts 104 from the blanks 108. In this regard, FIGS. 8A-8C are two perspective views and a side view of a lower die segment 248 of FIGS. 3A-6C illustrating heating element recesses 219 for receiving and housing electrical heating elements 217 (see FIG. 8D). FIG. 8D also illustrates a cross sectional view of the upper segmented die 242 and the lower segmented die 246 within the die assembly 218. Heating element recesses 219 are formed in both the upper segmented die 242 and the lower segmented die 246, with each upper die segment 244 and lower die segment 248 including a plurality of heating element recesses 219 to facilitate uniform heating of the upper segmented die 242 and the lower segmented die 246. Each electrical heating element 217 is coupled to its respective die segment 244, 248, within a corresponding heating element recess 219, and is configured to heat the respective die segment 244, 248 to at least a predetermined temperature, e.g., at least 900 degrees F. and as high as 1350 degrees F. or more in some embodiments.

In this example, the upper segmented die 242 and lower segmented die 246 are contained within an upper insulation subassembly 250 and a lower insulation subassembly 258. Electrical wiring 330 for each heating element 217 is routed along wiring channels 328 within the upper insulation subassembly 250 and a lower insulation subassembly 258 to provide electrical power to the electrical heating elements 217 and to protect the electrical wiring 330 from damage. One advantage of this arrangement is that the electrical elements can be easily removed and replaced as needed, with the upper and insulation subassembly 250 and lower insulation subassembly 258 providing thermal protection to the electrical wiring 330 to extend the life of these and other electrical components.

Figure 9A:
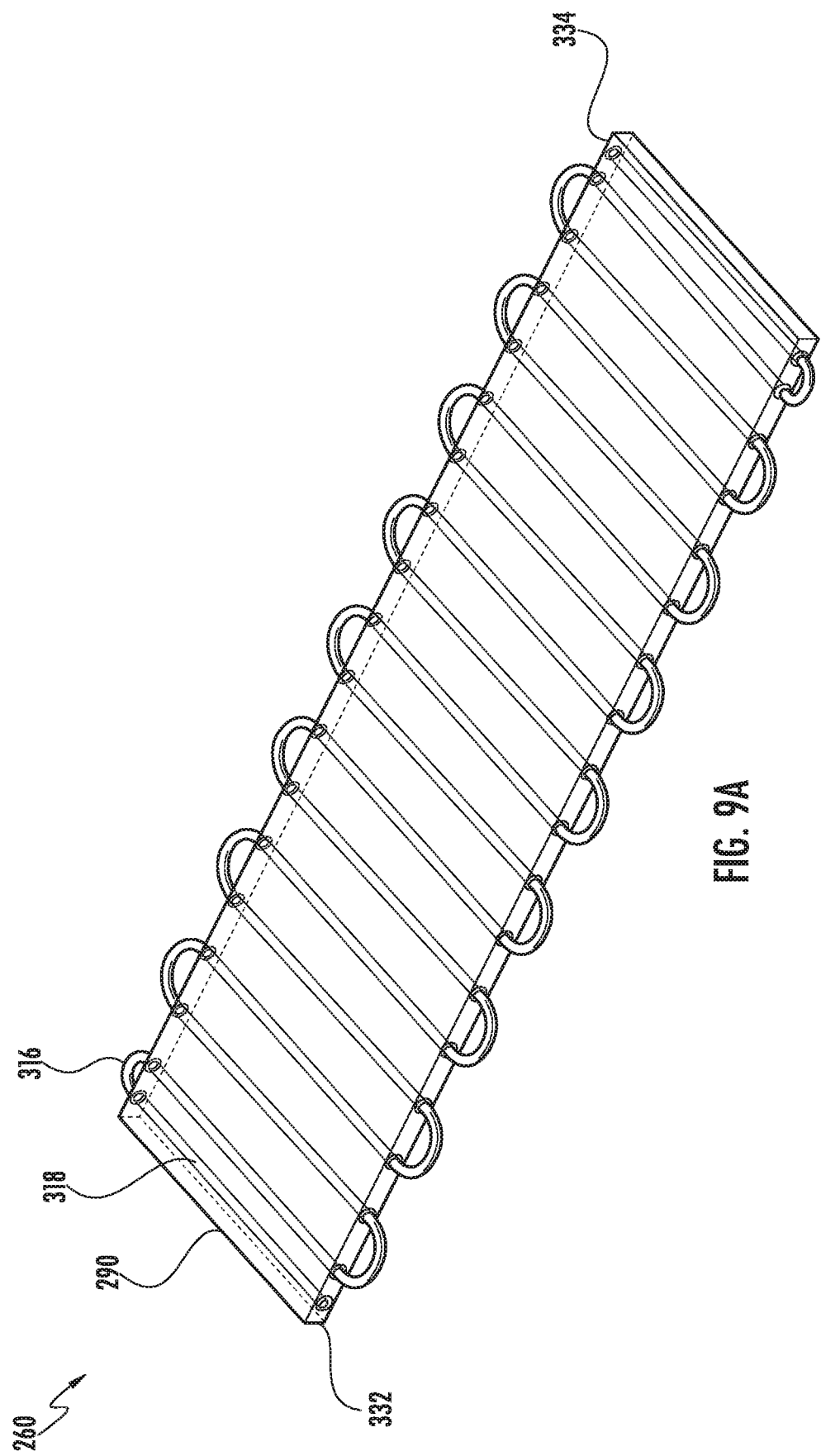

FIGS. 9A and 9B are respective perspective and side views of a cooling subassembly 260 of the die assembly 218 of FIGS. 3A-8D, for providing cooling and regulating temperature for the lower segmented 246 of the die assembly 218. It should also be understood that these and other features are also used with other segmented dies, including the upper segmented die 242 (e.g., punch block) of FIG. 4B, as described above.

The cooling subassembly 260 includes a chill plate 290 thermally coupled to the insulation material 284 of the insulation subassembly 258 (see FIG. 9B). The chill plate 290 includes exposed tubing 316 for transporting a cooling fluid 318 to facilitate cooling the die assembly and components thereof. The exposed tubing 316 includes an inlet 332 for receiving the cooling fluid 318 and an outlet 334 for outputting the cooling fluid 318 after it has travelled through the exposed tubing 316.

As will be appreciated by one skilled in the art, aspects of the present disclosure may be illustrated and described herein in any of a number of patentable classes or context including any new and useful process, machine, manufacture, or composition of matter, or any new and useful improvement thereof.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and "comprising," when used in this specification, specify the presence of stated features, steps, operations, elements, or components, but do not preclude the presence or addition of one or more other features, steps, operations, elements, components, or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A die assembly for forming finished parts from blanks, the die assembly comprising:
   an upper die section comprising an upper segmented die comprising a plurality of upper die segments releasably coupled to each other; and
   a lower die section comprising a lower segmented die comprising a plurality of lower die segments releasably coupled to each other,
   wherein the plurality of upper die segments is arranged in a linear array,
   wherein each upper die segment comprises a coupling structure configured to releasably couple the upper die segment to an adjacent upper die segment,
   wherein the coupling structure inhibits movement of the upper die segment with respect to the adjacent upper die segment in a longitudinal direction substantially parallel to the linear array, and
   wherein the coupling structure allows movement of the upper die segment with respect to the adjacent upper die segment in a transverse direction substantially orthogonal relative to the longitudinal direction.

2. The die assembly of claim 1, wherein, for each upper die segment, the coupling structure comprises:

a groove formed in the upper die segment, wherein the groove of the upper die segment corresponds to the groove in an adjacent upper die segment of the plurality of upper die segments, and wherein the upper die section further comprises:
a retainer structure configured to simultaneously engage with the grooves of at least two adjacent upper die segments to inhibit movement of the at least two adjacent upper die segments with respect to each other in the longitudinal direction.

3. The die assembly of claim 2, wherein the retainer structure comprises a ring-shaped element, and
wherein the grooves of the at least two adjacent upper die segments form a ring-shaped recess configured to releasably receive the ring-shaped element in the transverse direction to releasably couple the at least two adjacent upper die segments to each other.

4. The die assembly of claim 1, wherein the coupling structure of a first upper die segment of the plurality of upper die segments comprises a protrusion,
wherein the coupling structure of a second upper die segment of the plurality of upper die segments comprises a groove that corresponds to the protrusion of the first upper die segment,
wherein the first upper die segment is configured to be lowered in the transverse direction into the linear array adjacent to the second upper die segment, wherein the groove of the second upper die segment releasably receives the protrusion of the first upper die segment to releasably couple the first upper die segments to the second upper die segment.

5. The die assembly of claim 1, further comprising a plurality of heating elements coupled to at least one of the upper segmented die or the lower segmented die, wherein the plurality of heating elements are configured to heat the at least one of the upper segmented die or the lower segmented die to at least a predetermined temperature.

6. The die assembly of claim 5, wherein the predetermined temperature is at least about 900 degrees F.

7. The die assembly of claim 5, wherein the plurality of heating elements are coupled to the upper segmented die and the lower segmented die to heat the upper segmented die and the lower segmented die to at least the predetermined temperature.

8. The die assembly of claim 5, wherein each upper die segment comprises a heating element recess,
wherein each lower die segment comprises a heating element recess; and
wherein a respective heating element of the plurality of heating elements is disposed in each of the heating element recesses in each of the upper die segments and the lower die segments.

9. The die assembly of claim 1, further comprising:
a transfer plate releasably coupled to the upper segmented die, the transfer plate comprising an attachment point for an upper platen of a movable gantry press.

10. The die assembly of claim 9, further comprising:
an upper insulation subassembly comprising:
an upper insulation material disposed around the upper segmented die; and
an upper cladding material disposed around an outer surface of the upper insulation material; and
a lower insulation subassembly comprising:
a lower insulation material disposed around the lower segmented die; and
a lower cladding material disposed around an outer surface of the lower insulation material.

11. The die assembly of claim 10, further comprising:
a chill plate thermally coupled to at least one of the upper insulation material or the lower insulation material to facilitate cooling the die assembly.

12. The die assembly of claim 11, wherein the chill plate further comprises:
exposed tubing for transporting a cooling fluid to facilitate cooling the die assembly.

13. The die assembly of claim 10, further comprising a plurality of fastener assemblies, wherein each fastener assembly is configured to releasably attach a respective upper die segment to the transfer plate.

14. The die assembly of claim 13, wherein each fastener assembly comprises a hanger pad and a hanger rod,
wherein each upper die segment comprises:
a hanger pad recess for receiving a respective hanger pad; and
a lower hole portion transverse to the hanger pad recess for receiving the hanger rod,
wherein the upper insulation subassembly comprises a plurality of upper hole portions corresponding to each of the lower hole portions of the upper die segments, and
wherein each hanger rod is configured to be inserted through a respective upper hole portion of the upper insulation subassembly and through a respective lower hole portion of a respective upper die segment to couple to the respective hanger pad of the fastener assembly in the hanger pad recess of the respective upper die segment, to releasably attach the transfer plate to the respective upper die segment.

15. A system for fabricating finished parts, the system comprising:
a plurality of die assemblies located at a plurality of respective locations, each die assembly being configured to fabricate a respective finished part, each die assembly comprising:
an upper die section comprising an upper segmented die comprising a plurality of upper die segments releasably coupled to each other; and
a lower die section comprising a lower segmented die comprising a plurality of lower die segments releasably coupled to each other;
a robot configured to move between the plurality of respective locations and selectively load blanks into the plurality of die assemblies; and
a movable gantry press configured to move between the plurality of respective locations and selectively operate the plurality of die assemblies to form finished parts from the blanks.

16. A die assembly for forming finished parts from blanks, the die assembly comprising:
an upper die section comprising an upper segmented die comprising a plurality of upper die segments releasably coupled to each other;
a lower die section comprising a lower segmented die comprising a plurality of lower die segments releasably coupled to each other;
a transfer plate releasably coupled to the upper segmented die, the transfer plate comprising an attachment point for an upper platen of a movable gantry press;
an upper insulation subassembly comprising:
an upper insulation material disposed around the upper segmented die; and
an upper cladding material disposed around an outer surface of the upper insulation material; and a lower insulation subassembly comprising:
a lower insulation material disposed around the lower segmented die; and
a lower cladding material disposed around an outer surface of the lower insulation material.

17. The die assembly of claim 16, further comprising:
a chill plate thermally coupled to at least one of the upper insulation material or the lower insulation material to facilitate cooling the die assembly.

18. The die assembly of claim 17, wherein the chill plate further comprises:
exposed tubing for transporting a cooling fluid to facilitate cooling the die assembly.

19. The die assembly of claim 16, further comprising a plurality of fastener assemblies, wherein each fastener assembly is configured to releasably attach a respective upper die segment to the transfer plate.

20. The die assembly of claim 19, wherein each fastener assembly comprises a hanger pad and a hanger rod, wherein each upper die segment comprises:
a hanger pad recess for receiving a respective hanger pad; and
a lower hole portion transverse to the hanger pad recess for receiving the hanger rod,
wherein the upper insulation subassembly comprises a plurality of upper hole portions corresponding to each of the lower hole portions of the upper die segments, and
wherein each hanger rod is configured to be inserted through a respective upper hole portion of the upper insulation subassembly and through a respective lower hole portion of a respective upper die segment to couple to the respective hanger pad of the fastener assembly in the hanger pad recess of the respective upper die segment, to releasably attach the transfer plate to the respective upper die segment.

* * * * *